US008724686B2

(12) United States Patent
Barbotin

(10) Patent No.: US 8,724,686 B2
(45) Date of Patent: *May 13, 2014

(54) EQUALIZATION BY THE PULSE SHAPE INVERSE OF THE INPUT TO THE FRI PROCESSING IN PULSE BASED COMMUNICATIONS

(75) Inventor: Yann Barbotin, Ornex (FR)

(73) Assignee: QUALCOMM Incorporated, San Diego, CA (US)

( * ) Notice: Subject to any disclaimer, the term of this patent is extended or adjusted under 35 U.S.C. 154(b) by 784 days.

This patent is subject to a terminal disclaimer.

(21) Appl. No.: 12/577,923

(22) Filed: Oct. 13, 2009

(65) Prior Publication Data

US 2010/0238991 A1    Sep. 23, 2010

Related U.S. Application Data

(60) Provisional application No. 61/161,348, filed on Mar. 18, 2009, provisional application No. 61/161,656, filed on Mar. 19, 2009, provisional application No. 61/224,808, filed on Jul. 10, 2009, provisional application No. 61/247,122, filed on Sep. 30, 2009.

(51) Int. Cl.
*H03H 7/30* (2006.01)
*H03H 7/40* (2006.01)
*H03K 5/159* (2006.01)

(52) U.S. Cl.
USPC ........... 375/231; 375/230; 375/232; 375/350; 375/346; 375/285; 455/501; 455/296; 455/307

(58) Field of Classification Search
USPC ......... 375/231, 230, 232, 350, 346, 285, 260; 455/501, 296, 307
See application file for complete search history.

(56) References Cited

U.S. PATENT DOCUMENTS

| | | | |
|---|---|---|---|
| 5,841,821 | A | 11/1998 | Doyle et al. |
| 6,044,107 | A | 3/2000 | Gatherer et al. |
| 6,795,002 | B2 | 9/2004 | Gupta |
| 2004/0179631 | A1 | 9/2004 | Nielsen |
| 2007/0041440 | A1 | 2/2007 | Schoenbeck et al. |
| 2007/0081578 | A1* | 4/2007 | Fudge et al. ................... 375/130 |
| 2008/0056419 | A1 | 3/2008 | Lee et al. |
| 2008/0058023 | A1 | 3/2008 | Seshadri et al. |
| 2009/0190689 | A1* | 7/2009 | Blu et al. ...................... 375/285 |
| 2009/0191814 | A1* | 7/2009 | Blu et al. ...................... 455/63.1 |

(Continued)

FOREIGN PATENT DOCUMENTS

| | | |
|---|---|---|
| CN | 1274097 C | 9/2006 |
| JP | 2008061239 A | 3/2008 |

(Continued)

OTHER PUBLICATIONS

U.S. Appl. No. 12/577,896, filed Oct. 13, 2009.*

(Continued)

*Primary Examiner* — Phuong Phu
(74) *Attorney, Agent, or Firm* — Paul S. Holdaway

(57) ABSTRACT

Certain aspects of the present disclosure relate to a method for equalizing a pulse signal corrupted by a noise and by various channel effects for obtaining a signal based on the periodic-sinc pulse, which is suitable for Finite Rate of Innovation (FRI) processing applied at a receiver of a pulse-based communication system (e.g., an Ultra-Wideband receiver).

20 Claims, 4 Drawing Sheets

(56) References Cited

U.S. PATENT DOCUMENTS

| | | |
|---|---|---|
| 2010/0239055 A1 | 9/2010 | Barbotin et al. |
| 2010/0239103 A1 | 9/2010 | Barbotin |
| 2010/0240309 A1* | 9/2010 | Barbotin et al. ............ 455/41.3 |
| 2011/0007792 A1* | 1/2011 | Kimata ........................ 375/232 |

FOREIGN PATENT DOCUMENTS

| | | |
|---|---|---|
| WO | 2009096994 A2 | 8/2009 |
| WO | WO2009096995 | 8/2009 |
| WO | 2010108043 A2 | 9/2010 |

OTHER PUBLICATIONS

Blu, T et al.: "Sparse Sampling of Signal Innovations [Theory, algorithms, and performance bounds]," IEEE Signal Processing Magazine, vol. 25, No. 2, (Mar. 1, 2008), pp. 31-40, XP011206128, IEEE Service Center, Piscataway, NJ, US, ISSN: 1053-5888.

International Search Report and Written Opinion—PCT/US2010/027875, International Search Authority—European Patent Office—Mar. 17, 2011.

International Search Report and Written Opinion—PCT/US2010/050994, International Search Authority—European Patent Office—Feb. 10, 2011.

Vanderperren, Y. et al.: "A reconfigurable pulsed UWB receiver sampling below Nyquist rate," Proceedings of the 2008 IEEE International Conference on Ultra-Wideband, (Sep. 10, 2008), pp. 145-148, XP031350168, IEEE, Piscataway, NJ, USA, ISBN: 978-1-4244-2216-6.

Vanderperren, Y. et al.: "Performance Analysis of a Flexible Subsampling Receiver for Pulsed UWB Signals," IEEE Transactions on Wireless Communications, vol. 8, No. 8, IEEE Service Center, Piscataway, NJ, US, (Aug. 1, 2009), pp. 4134-4142, XP011271978, ISSN: 1536-1276.

Zhu, T. et al.: "A variable step-size dual-mode blind equalization algorithm based on Cadzow Theorem," International Conference on Wireless Communications, Networking and Mobile Computing, WIC0M 2008, pp. 1-3, XP002623379, DOI: 10.1109/WIC0M.2008.489.

Abramowitz M., et al., "Handbook of Mathematical Functions with Formulas, Graphs, and Mathematical Tables", Dover, New York, ninth dover printing, tenth gpo printing edition, 1964. ISBN 0-486-61272-4.

Barbotin et al., "Finite Rate of Innovation sampling techniques for embedded UWB devices", Master's Thesis, Department of Communication Systems, Ecole Polytechnique Federale de Lausanne, Mar. 2009, XP55023414, Retrieved from the Internet: URL:http://infoscience.epfl.ch/record/141997/files/mscThesis barbotin.pdf [retrieved on Mar. 29, 2012].

Barth W., et al., "Calculation of the eigenvalues of a symmetric tridiagonal matrix by the method of bisection", Numerische Mathematik, 9 (5):386-393, Apr. 1967. URL:http://dx.doi.org/10.1007/BF02162154.

Danielson G.C., et al., "Some improvements in practical fourier analysis and their application to x-ray scattering from liquids", Journal of the Franklin Institute, 233(4 and 5):365-380 and 432-452, 1942, Bibliography 79.

Dragotti, et al., "Sampling Moments and Reconstructing Signals of Finite Rate of Innovation: Shannon Meets Strang-Fix", 2007, IEEE Transactions On Signal Processing, vol. 55, No. 7, pp. 1741-1757.

Fernando K. V., "Accurate babe factorisation of tridiagonal matrices for eigenproblems", Technical report, NAG Ltd, 1995.

Godunov S.K., et al., "Guaranteed Accuracy in Numerical Linear Algebra", Kluwer Academic, Dordrecht, 1993.

Hormati A., et al., "Distributed Sampling of Signals Linked by Sparse Filtering : Theory and Applications" IEEE Transactions on Signal Processing, IEEE Service Center, New York, NY, US, vol. 58, No. 3, Oct. 20, 2009, pp. 1095-1109, XP011283778 ISSN: 1053-587X the whole document.

Imhof J.P., "Computing the distribution of quadratic forms in normal variables", Biometric, 48(3-4):419-426, 1961, doi: 10.1093/biomet/48.3-4.419. URL:http://biomet.oxfordjournals.org/cgi/reprint/48/3-4/419.pdf.

James a. Cadzow, "Signal Enhancement—A Composite Property Mapping Algorithm", IEEE Transactions on Acoustics. Speech and Signal Processing. January 1988, pp. 49-62, vol. 36. No. 1.

Lanczos C., "An iteration method for the solution of the eigenvalue problem of linear differential and integral operators", J. Res. Nat. Bur. Standards, 45:255-282, 1950.

Liu H., et al., "A new chi-square approximation to the distribution of non-negative definite quadratic forms in non-central 77 Bibliography 78 normal variables", Computational Statistics & Data Analysis, 53(4):853-856, 2009. ISSN 0167-9473, DOI: 10.1016/j.csda.2008.11.025.URL:http://www.sciencedirect.com/science/article/B6V8V-4V353XG-2/2/83450bca4ff6e29b9579fd.

Marziliano P., "Sampling Innovations. PhD thesis, Communication Systems Department", EPFL, Lausanne, Switzerland, Apr. 2001, pp. 1-110. URL:http://www3.ntu.edu.sg/home/epina/Publications/PinaMarzilianoThesisBook.pdf.

Pearson E.S., "Note on an approximation to the distribution of non-central_2", Biometric, 46(3-4):364, 1959, DOI: 10.1093/biomet/46.3-4.364. URL:http://biomet.oxfordjournals.org/cgi/reprint/46/3-4/352.pdf.

Porat B., et al., "Computation of the exact information matrix of gaussian time series with stationary random components", Acoustics, Speech and Signal Processing, IEEE Transactions on, 34(1):118-130, Feb. 1986. ISSN 0096-3518.

Schonberg I. J., "Contributions to the problem of approximation of equidistant data by analytic functions", Quart, Appl, Math., 4:45~U99 and 112~U141, 1946.

Unser M., "Splines: A perfect fit for signal and image processing", IEEE Signal Processing Society's 2000 magazine award, 16(6):22-38, Nov. 1999. URL:http://bigwww.epfl.ch/publications/unser9902.html.

Vetterli et al., "Sampling Signals With Finite Rate of Innovation", IEEE Transactions on Signal Processing, June 2002, pp. 1417-1428, vol. 50, No. 6.

Arce G R et al., "Monobit Digital Receivers for Ultrawideband Communications", IEEE Transactions on Wireless Communications, IEEE Service Center, Piscataway, NJ, US, vol. 4, No. 4, Jul. 1, 2005, pp. 1337-1344, XP011139690, ISSN: 1536-1276, DOI:10.1109/TWC.2005.850270.

* cited by examiner

EQUALIZATION BY THE PULSE SHAPE INVERSE OF THE INPUT TO THE FRI PROCESSING IN PULSE BASED COMMUNICATIONS

CLAIM OF PRIORITY UNDER 35 U.S.C. §119

The present application for patent claims benefit of Provisional Application Ser. Nos. 61/161,348 filed Mar. 18, 2009, 61/161,656 filed Mar. 19, 2009, 61/224,808 filed Jul. 10, 2009, and 61/247,122 filed Sep. 30, 2009, and assigned to the assignee hereof and hereby expressly incorporated by reference herein.

BACKGROUND

1. Field

Certain aspects of the present disclosure generally relate to a wireless communication and, more particularly, to equalization of a received pulse signal.

2. Background

Ultra-Wideband (UWB) communications are radio communications that use a frequency bandwidth larger than 500 MHz. In comparison to narrow-band communications which rely on modulation of a carrier frequency, the large bandwidth of UWB communications allows sending signals with features well-localized in time. If a signal is more localized in time, then it is more spread in frequency. This allows communications based on pulses, while information can be encoded in a distance between pulses (i.e., a Pulse Position Modulation: PPM), in a pulse amplitude (i.e., a Pulse Amplitude Modulation: PAM) or in a pulse width (i.e., Pulse Width Modulation: PWM). One of the key advantages of pulse-based communication is ability to precisely localize time of arrival of the information (i.e., arrival of the pulse).

A signal at the UWB receiver is typically based on a pulse signal corrupted by stationary and non-stationary noise and by various channel effects, wherein the pulse signal is different than a periodic sinc shaped pulse. For example, the pulse signal can be based on a symmetrical low-pass pulse. On the other hand, a parametric Finite Rate of Innovation (FRI) processing that may be applied after the UWB processing requires an input signal based on the periodic-sine signal. Therefore, the received UWB pulse signal needs to be properly adjusted before being processed by the FRI block.

A method is proposed in the present disclosure to equalize the received UWB pulse signal in such a way to generate an output signal based on the periodic-sinc function suitable for the subsequent FRI processing.

SUMMARY

Certain aspects provide a method for wireless communications. The method generally includes receiving a signal transmitted over a wireless channel, wherein the received signal comprises a corrupted impulse signal, performing a transform of a non-corrupted version of the impulse signal and of a reference signal, and equalizing the received signal using the transformed non-corrupted version of the impulse signal and the transformed reference signal.

Certain aspects provide an apparatus for wireless communications. The apparatus generally includes a receiver configured to receive a signal transmitted over a wireless channel, wherein the received signal comprises a corrupted impulse signal, a circuit configured to perform a transform of a non-corrupted version of the impulse signal and of a reference signal, and an equalizer configured to equalize the received signal using the transformed non-corrupted version of the impulse signal and the transformed reference signal.

Certain aspects provide an apparatus for wireless communications. The apparatus generally includes means for receiving a signal transmitted over a wireless channel, wherein the received signal comprises a corrupted impulse signal, means for performing a transform of a non-corrupted version of the impulse signal and of a reference signal, and means for equalizing the received signal using the transformed non-corrupted version of the impulse signal and the transformed reference signal.

Certain aspects provide a computer-program product for wireless communications. The computer-program product includes a computer-readable medium comprising instructions executable to receive a signal transmitted over a wireless channel, wherein the received signal comprises a corrupted impulse signal, perform a transform of a non-corrupted version of the impulse signal and of a reference signal, and equalize the received signal using the transformed non-corrupted version of the impulse signal and the transformed reference signal.

Certain aspects provide a headset. The headset generally includes a receiver configured to receive a signal transmitted over a wireless channel, wherein the received signal comprises a corrupted impulse signal, a circuit configured to perform a transform of a non-corrupted version of the impulse signal and of a reference signal, an equalizer configured to equalize the received signal using the transformed non-corrupted version of the impulse signal and the transformed reference signal, and a transducer configured to provide an audio output based on the equalized received signal.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
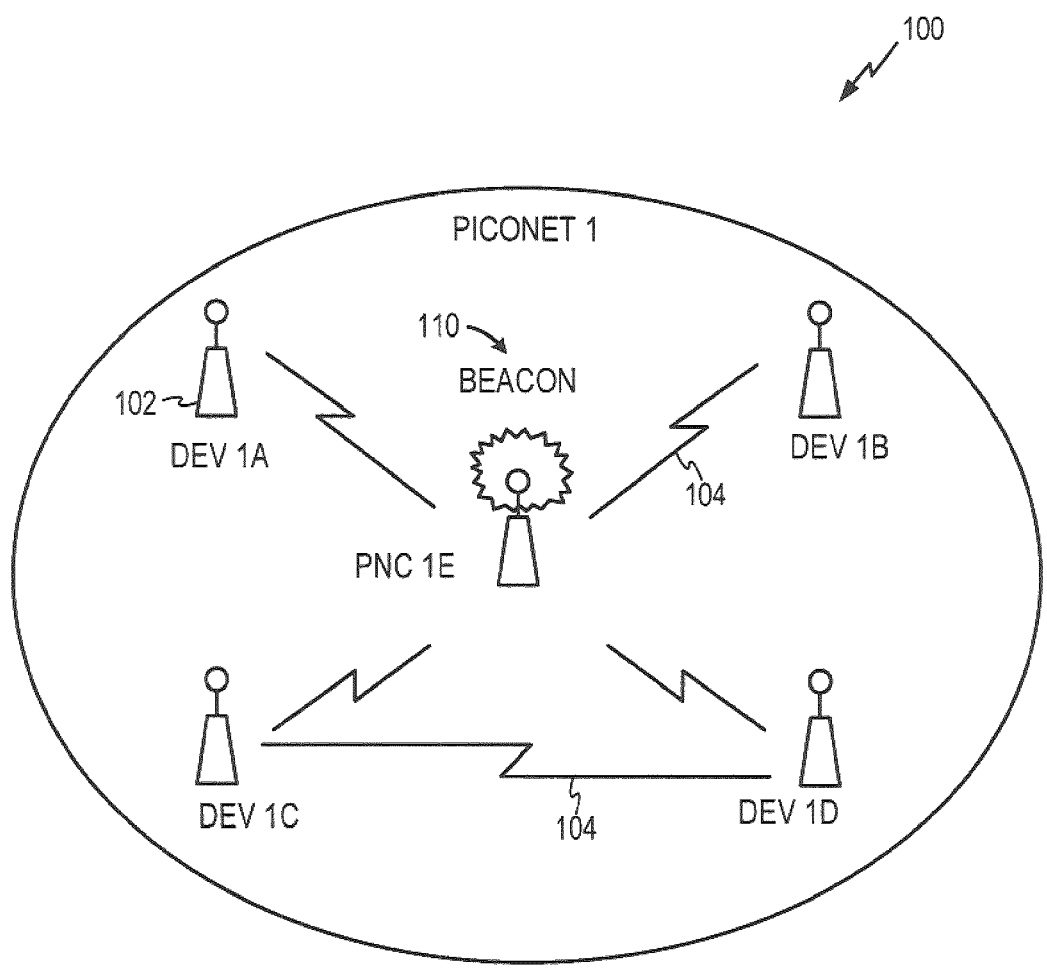
FIG. 1 illustrates an example wireless communication system in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on a single carrier transmission. Aspects disclosed herein may be advantageous to systems employing Ultra-Wideband (UWB) signals including millimeter-wave signals. However, the present disclosure is not intended to be limited to such systems, as other coded signals may benefit from similar advantages.

The teachings herein may be incorporated into (e.g., implemented within or performed by) a variety of wired or wireless apparatuses (e.g., nodes). In some aspects, a node implemented in accordance with the teachings herein may comprise an access point or an access terminal.

An access terminal ("AT") may comprise, be implemented as, or known as an access terminal, a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, a headset, a sensor or any other suitable device that is configured to communicate via a wireless or wired medium. In some aspects the node is a wireless node. Such wireless node may provide, for example, connectivity for or to a network (e.g., a wide area network such as the Internet or a cellular network) via a wired or wireless communication link.

FIG. 1 illustrates an example of a wireless communication system 100 (i.e., a Piconet 1) in which aspects of the present disclosure may be employed. As illustrated, Piconet 1 may include a number of wireless devices 102 or "terminals" 1A-1E that can communicate with one another using relatively short-range wireless links 104. In the illustrated example, terminal 1E acts as a PNC for Piconet 1. Although illustrated with five devices, it should be appreciated that any number of devices (i.e., two or more) may form a wireless personal area network.

Each of the terminals 102 in the Piconet 1 may include, among other things, a wireless transceiver to support wireless communication and controller functionality to manage communication with the network. The controller functionality may be implemented within one or more digital processing devices. The wireless transceiver may be coupled to one or more antennas to facilitate the transmission of signals into and the reception of signals from a wireless channel. Any type of antennas may be used including, for example, dipoles, patches, helical antennas, antenna arrays, and/or others.

The devices in the Piconet 1 may include any of a wide variety of different device types including, for example, laptop, desktop, palmtop, or tablet computers having wireless networking functionality, computer peripherals having wireless networking capability, personal digital assistants (PDAs) having wireless networking capability, cellular telephones and other handheld wireless communicators, pagers, wireless network interface modules (e.g., wireless network interface cards, etc.) incorporated into larger systems, multimedia devices having wireless networking capability, audio/visual devices having wireless networking capability, home appliances having wireless networking capability, jewelry or other wearable items having wireless networking capability, wireless universal serial bus (USB) devices, wireless digital imaging devices (e.g., digital cameras, camcorders, etc.), wireless printers, wireless home entertainment systems (e.g., DVD/CD players, televisions, MP3 players, audio devices, etc.), and/or others. In one configuration, for example, a wireless personal area network may include a user's laptop computer that is wirelessly communicating with the user's personal digital assistant (PDA) and the user's printer in a short-range network. In another possible configuration, a wireless personal area network may be formed between various audio/visual devices in, for example, a user's living room. In yet another configuration, a user's laptop computer may communicate with terminals associated with other users in a vicinity of the user. Many other scenarios are also possible.

Standards have been developed, and are currently in development, to provide a framework to support development of interoperable products that are capable of operating as part of a wireless personal area network (e.g., the Bluetooth standard (Specification of the Bluetooth System, Version 3.0, Bluetooth SIG, Inc., April 2009), the IEEE 802.15 standards, etc.). The IEEE 802.15.3c standard, for example, is a high data rate wireless personal area network standard. In accordance with the IEEE 802.15.3c standard, one of the terminals within a piconet is selected as a Piconet Coordinator (PNC) to coordinate the operation of the network. For example, with reference to FIG. 1, the device PNC 1E represents a PNC for the Piconet 1 in an IEEE 802.15.3c implementation.

As illustrated, PNC 1E may transmit a beacon signal 110 (or simply "beacon") to other devices of Piconet 1, which may help the other terminals within Piconet 1 synchronize their timing with PNC 1E. Thus, the beacon, typically sent at the beginning of every superframe, contains information that may be used to time-synchronize the terminals in the piconet. Each terminal in the piconet, including the PNC, may reset its superframe clock to zero at the beginning of the beacon preamble. If a terminal does not hear a beacon, it may reset its superframe clock to zero at the instant where it expected to hear the beginning of the beacon preamble (e.g., based on previous superframe timing).

In addition, terminals 102 can be communicating with one another in a peer-to-peer configuration. For example, the device DEV 1C may be in communication with the device DEV 1D using the link 104. In peer-to-peer ad hoc networks, devices (nodes) within range of each other, such as the devices DEV 1C and DEV 1D in the network 100, can communicate directly with each other without an access point, such as the PNC 1E, and/or a wired infrastructure to relay their communication. Additionally, peer devices or nodes can relay traffic. The devices 102 within the network 100 communicating in a peer-to-peer manner can function similar to base stations and relay traffic or communications to other devices, functioning similar to base stations, until the traffic reaches its ultimate destination. The devices can also transmit control channels, which carry information that can be utilized to manage the data transmission between peer nodes.

The communication network 100 can include any number of devices or nodes that are in wireless (or wired) communication. Each node can be within range of one or more other nodes and can communicate with the other nodes or through utilization of the other nodes, such as in a multi-hop topography (e.g., communications can hop from node to node until reaching a final destination). For example, a sender node may wish to communicate with a receiver node. To enable packet transfer between sender node and receiver node, one or more intermediate nodes can be utilized. It should be understood that any node can be a sender node and/or a receiver node and can perform functions of either sending and/or receiving information at substantially the same time (e.g., can broadcast or communicate information at about the same time as receiving information) or at different times.

Figure 2:
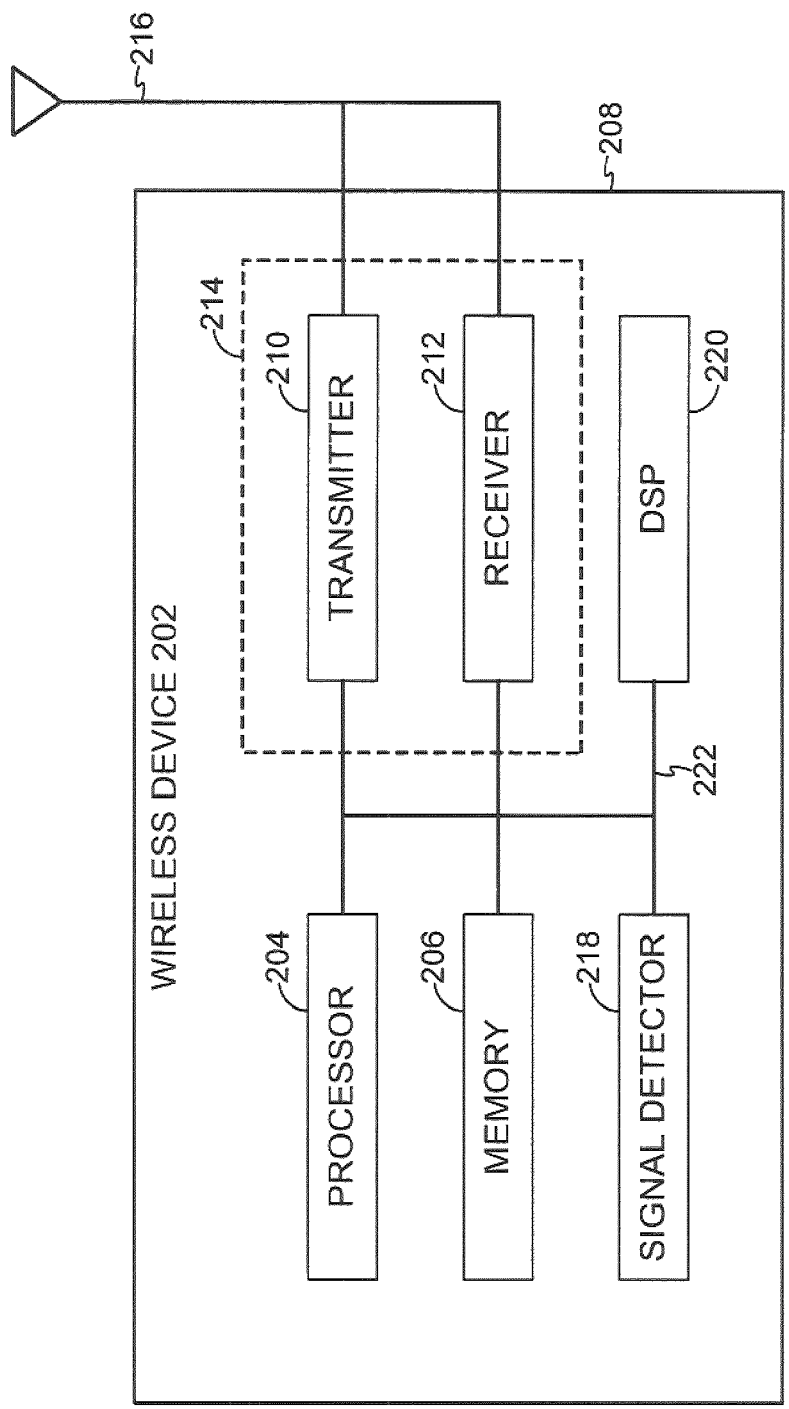
FIG. 2 illustrates various components that may be utilized in a wireless device in accordance with certain aspects of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be the PNC 1E or a terminal 102 in the Piconet 1.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Ultra-Wideband (UWB) communications performed by the wireless system 100 comprise radio communications that use a frequency bandwidth larger than 500 MHz. In comparison to narrow-band communications which rely on modulation of a carrier frequency, the large bandwidth of UWB communications allows sending signals with features well-localized in time. If a signal is more localized in time, then it is more spread in frequency. This allows communications based on pulses, while information can be encoded in a distance between pulses (i.e., a Pulse Position Modulation: PPM), in a pulse amplitude (i.e., a Pulse Amplitude Modulation: PAM) or in a pulse width (i.e., Pulse Width Modulation: PWM). One of the key advantages of pulse-based communication is ability to precisely localize time of arrival of the information (i.e., arrival of the pulse).

Finite Rate Sampling and Equalization in a Non-Ideal Setup

Finite Rate of Innovation (FRI) is a parametric processing approach that may be applied on signals received by a typical Ultra-Wideband (UWB) device, such as the device 202. The FRI processing may require an input signal based on the periodic-sinc function, while the received UWB signal may be typically based on different types of pulses such as a symmetrical low-pass pulse signal. Because of that, the received UWB signal may need to be properly adjusted (i.e., equalized) before being input into the subsequent FRI block.

Certain aspects of the present disclosure support a method for equalizing the received signal that comprises a corrupted impulse signal different than the periodic-sinc signal to obtain a version of the periodic-sinc signal suitable for the FRI processing. The proposed solution relies on similarity between the pulse-shape and a Power Spectral Density (PSD) of noise at the UWB receiver. The proposed equalization algorithm is based on a Discrete Fourier Transform (DFT) of the targeted periodic-sinc pulse-shape signal. It should be noted that in the same time a whitening of the noise may be also achieved, which is a desirable feature of the proposed equalizer. The noise may be whitened at the output of equalizer because the input white Gaussian noise is processed by the same filtering chain as the received signal.

Figure 3:
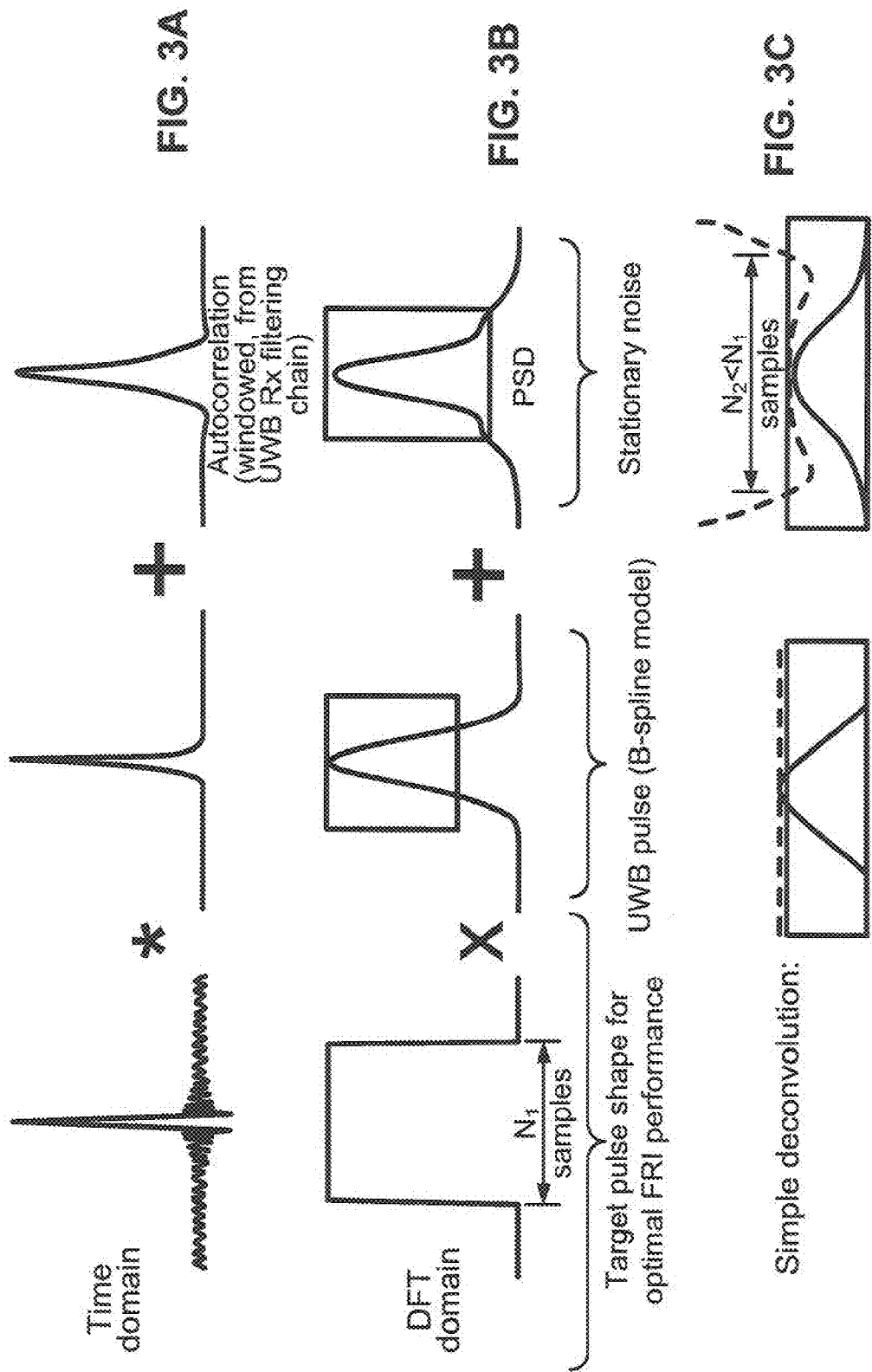
FIG. 3 illustrates equalization of a received pulse signal to match a periodic sinc pulse shape signal in accordance with certain aspects of the present disclosure.

FIG. 3 illustrates equalization of the received pulse signal applied to obtain the desired periodic sinc pulse shape based signal. FIGS. 3A-3B illustrate (in time and frequency domain, respectively) the ideal dirichlet kernel shaped pulse (i.e., the periodic sinc signal) corrupted by a stationary noise and by the UWB transceiver, wherein corruption introduced at the UWB transceiver may be modeled using a B-spline shaped point-spread function.

Figure 4:
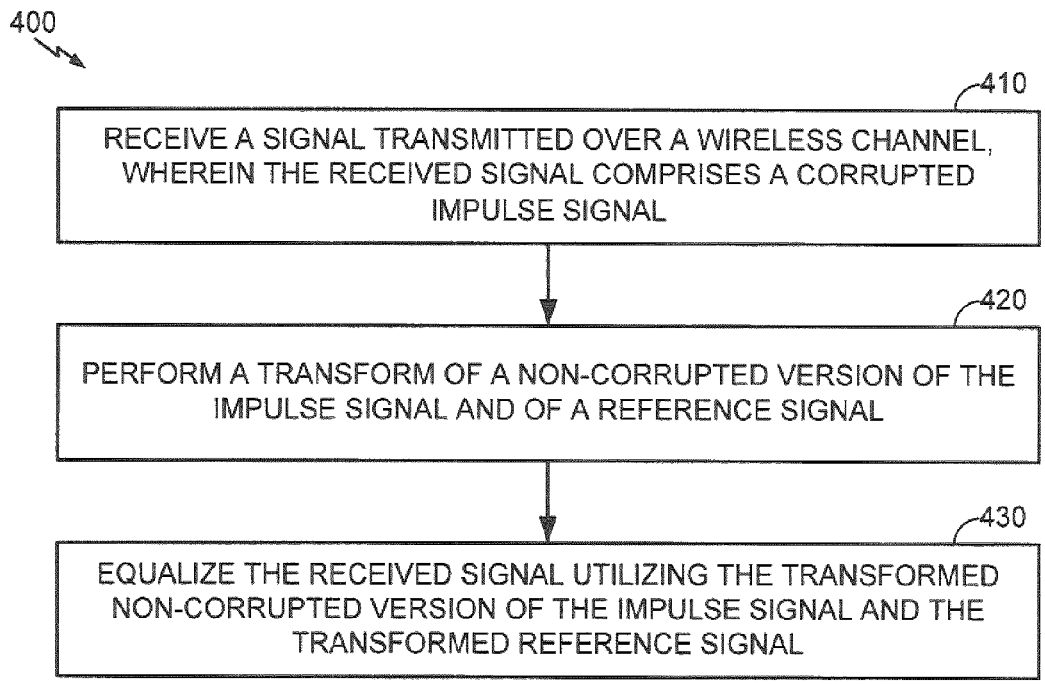
FIG. 4 illustrates example operations for equalization of a received signal to match the periodic-sinc pulse shape signal in accordance with certain aspects of the present disclosure.

FIG. 4 illustrates example operations 400 for equalization of the received signal to obtain a signal based on the periodic-sinc pulse shape in accordance with certain aspects of the present disclosure. At 410, a signal transmitted over a wireless channel may be received at the UWB receiver, wherein the received signal may comprise a corrupted impulse signal different than the desired periodic-sinc signal. At 420, the DFT or some other transform of a non-corrupted version (i.e., a version without corruption from the wireless channel and noise) of the acquired impulse signal and the DFT of a reference signal may be performed. The ideal version of the acquired impulse signal (i.e., the pulse without corruption from the wireless channel and noise) may be known in advance at the receiver. The reference signal may be, for example, the targeted periodic-sinc pulse shape signal.

At 430, the received signal may be equalized to obtain a version of the periodic-sinc pulse shape signal by using the DFT of the non-corrupted impulse signal and the DFT of the reference signal. In one aspect of the present disclosure, the DFT coefficient W[w] of the equalizer for an arbitrary frequency w of the received signal may be obtained as:

$$W[w]=P^{-1}[w]\cdot rect[w], \quad (1)$$

where P[w] represents the DFT of the non-corrupted version of the acquired pulse signal, and rect[w] represents the DFT of the targeted ideal periodic-sinc pulse shape signal.

A signal obtained by applying the equalizer defined by equation (1) on the received signal may comprise a version of the periodic-sinc pulse shape signal. The equalized signal may be based on the ideal periodic-sinc pulse shape signal, and may be corrupted by the noise and by various channel effects.

As illustrated in FIG. 3C, the equalizer defined by equation (1) may comprise deconvolution, i.e., multiplication of the received signal by the inverse (in the Fourier domain) of the pulse signal. The proposed equalization may yield the periodic sinc pulse, as well as a whitened noise for low frequencies. As illustrated in FIG. 3C, only a portion of the DFT coefficients of the equalized signal may be utilized for the FRI processing.

In another aspect of the present disclosure, equalization of the received pulse signal may be based on the Wiener deconvolution filter given as:

$$W[w] = \frac{P^*[w]}{P[w] \cdot P^*[w] + NSR[w]}, \quad (2)$$

where P·[w] is a conjugate of P[w] and NSR[w] is a spectral noise-to-signal ratio.

Figure 4A:
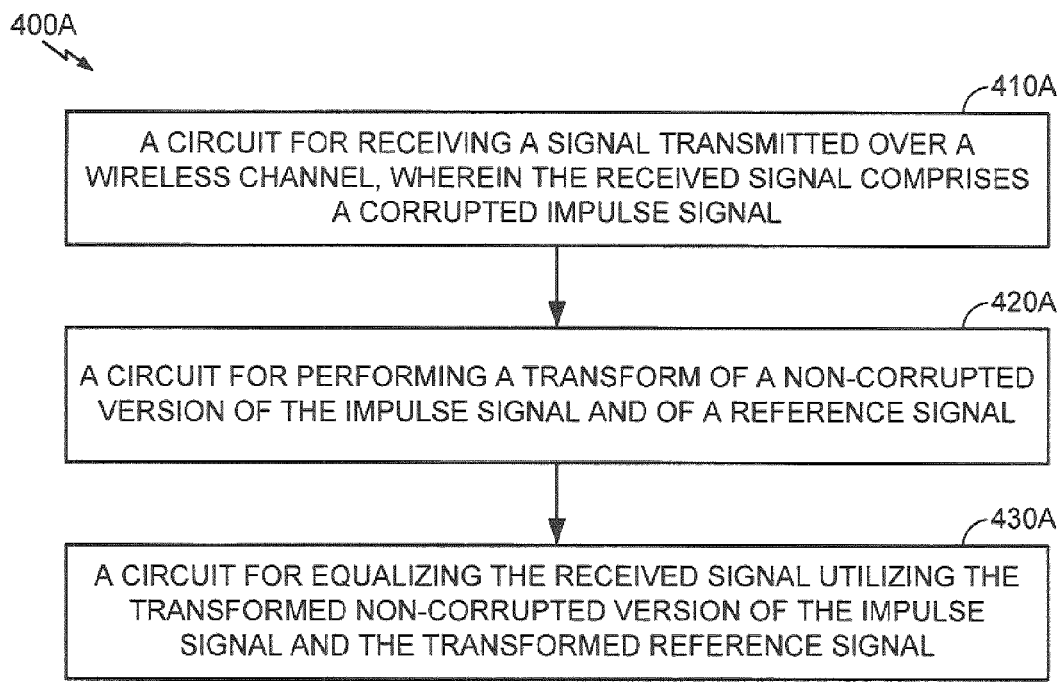
FIG. 4A illustrates example components capable of performing the operations illustrated in FIG. 4.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, blocks 410-430 illustrated in FIG. 4 correspond to circuit blocks 410A-430A illustrated in FIG. 4A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications, comprising:
   receiving a signal transmitted over a wireless channel, wherein the received signal comprises a corrupted impulse signal;
   performing a transform of a non-corrupted version of the impulse signal and of a reference signal; and
   equalizing the received signal using the transformed non-corrupted version of the impulse signal and the transformed reference signal.

2. The method of claim 1, wherein the reference signal comprises a periodic-sinc signal.

3. The method of claim 1, wherein the transform comprises a discrete Fourier transform (DFT).

4. The method of claim 1, wherein the impulse signal is corrupted by noise and by effects of the wireless channel.

5. The method of claim 1, wherein equalizing the received signal comprises:
   applying a deconvolution filter on the received signal in frequency domain.

6. The method of claim 5, wherein an amplitude spectrum of the deconvolution filter is based on a discrete Fourier transform (DFT) of the non-corrupted version of the impulse signal and a spectral noise-to-signal ratio related to the received signal.

7. An apparatus for wireless communications, comprising:
   a receiver configured to receive a signal transmitted over a wireless channel, wherein the received signal comprises a corrupted impulse signal;
   a circuit configured to perform a transform of a non-corrupted version of the impulse signal and of a reference signal; and
   an equalizer configured to equalize the received signal using the transformed non-corrupted version of the impulse signal and the transformed reference signal.

8. The apparatus of claim 7, wherein the reference signal comprises a periodic-sinc signal.

9. The apparatus of claim 7, wherein the transform comprises a discrete Fourier transform (DFT).

10. The apparatus of claim 7, wherein the impulse signal is corrupted by noise and by effects of the wireless channel.

11. The apparatus of claim 7, wherein the equalizer configured to equalize the received signal comprises:
    a circuit configured to apply a deconvolution filter on the received signal in frequency domain.

12. The apparatus of claim 11, wherein an amplitude spectrum of the deconvolution filter is based on a discrete Fourier transform (DFT) of the non-corrupted version of the impulse signal and a spectral noise-to-signal ratio related to the received signal.

13. An apparatus for wireless communications, comprising:
    means for receiving a signal transmitted over a wireless channel, wherein the received signal comprises a corrupted impulse signal;
    means for performing a transform of a non-corrupted version of the impulse signal and of a reference signal; and
    means for equalizing the received signal using the transformed non-corrupted version of the impulse signal and the transformed reference signal.

14. The apparatus of claim 13, wherein the reference signal comprises a periodic-sinc signal.

15. The apparatus of claim 13, wherein the transform comprises a discrete Fourier transform (DFT).

16. The apparatus of claim 13, wherein the impulse signal is corrupted by noise and by effects of the wireless channel.

17. The apparatus of claim 13, wherein the means for equalizing the received signal comprises:
    means for applying a deconvolution filter on the received signal in frequency domain.

18. The apparatus of claim 17, wherein an amplitude spectrum of the deconvolution filter is based on a discrete Fourier transform (DFT) of the non-corrupted version of the impulse signal and a spectral noise-to-signal ratio related to the received signal.

19. A computer-program product for wireless communications, comprising a non-transitory computer-readable medium comprising instructions executable to:
    receive a signal transmitted over a wireless channel, wherein the received signal comprises a corrupted impulse signal;
    perform a transform of a non-corrupted version of the impulse signal and of a reference signal; and
    equalize the received signal using the transformed non-corrupted version of the impulse signal and the transformed reference signal.

20. A headset, comprising:
    a receiver configured to receive a signal transmitted over a wireless channel, wherein the received signal comprises a corrupted impulse signal;
    a circuit configured to perform a transform of a non-corrupted version of the impulse signal and of a reference signal;
    an equalizer configured to equalize the received signal using the transformed non-corrupted version of the impulse signal and the transformed reference signal; and a transducer configured to provide an audio output based on the equalized received signal.

* * * * *